United States Patent
Koo

(10) Patent No.: US 9,014,037 B2
(45) Date of Patent: Apr. 21, 2015

(54) APPARATUS AND METHOD FOR TRANSMITTING/RECEIVING DATA IN COMMUNICATION SYSTEM

(71) Applicant: Electronics and Telecommunications Research Institute, Daejeon (KR)

(72) Inventor: Ki-Jong Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 53 days.

(21) Appl. No.: 13/662,757

(22) Filed: Oct. 29, 2012

(65) Prior Publication Data
US 2013/0114448 A1   May 9, 2013

(30) Foreign Application Priority Data
Oct. 28, 2011   (KR) .................. 10-2011-0111525

(51) Int. Cl.
*G01R 31/08* (2006.01)
*H04W 24/00* (2009.01)
*H04W 28/02* (2009.01)
*H04L 12/801* (2013.01)
*H04L 1/00* (2006.01)
*H04W 28/06* (2009.01)

(52) U.S. Cl.
CPC .......... *H04W 24/00* (2013.01); *H04W 28/065* (2013.01); *H04W 28/0284* (2013.01); *H04L 47/127* (2013.01); *H04L 1/0009* (2013.01); *H04L 1/0031* (2013.01)

(58) Field of Classification Search
CPC .................................................. H04W 24/00
USPC ................. 370/252–253, 352–401, 465–494; 707/103
See application file for complete search history.

(56) References Cited

U.S. PATENT DOCUMENTS

| | | | |
|---|---|---|---|
| 7,630,308 B1 * | 12/2009 | Loher | 370/230.1 |
| 7,876,685 B2 | 1/2011 | Botzko et al. | |
| 2004/0215812 A1 | 10/2004 | Lu | |
| 2005/0050090 A1 * | 3/2005 | Kawahata et al. | 707/103 Y |
| 2007/0133515 A1 * | 6/2007 | Kumar et al. | 370/352 |
| 2009/0213831 A1 | 8/2009 | Yousef | |
| 2010/0166006 A1 * | 7/2010 | Xu | 370/401 |
| 2011/0096776 A1 | 4/2011 | Botzko et al. | |

FOREIGN PATENT DOCUMENTS

| | | |
|---|---|---|
| EP | 1175047 A3 | 1/2002 |
| JP | 2010-41496 | 2/2010 |
| KR | 1020010038203 | 5/2001 |
| KR | 1020040044218 | 5/2004 |
| KR | 1020070025323 | 3/2007 |

* cited by examiner

*Primary Examiner* — Iqbal Zaidi
(74) *Attorney, Agent, or Firm* — Nelson Mullins Riley & Scarborough LLP

(57) ABSTRACT

Disclosed is an apparatus for transmitting data in a communication system, including: a depacketizer configured to receive loss information on a data packet and congestion information on the channel from a terminal receiving the data packet through the channel; a frame assembly configured to confirm a congestion situation predictor from the congestion information and frame-aggregate data transmitted to the terminal according to the congestion situation predictor; a redundancy controller configured to confirm a data packet loss predictor from the loss information and generate redundancy data of the data according to the data packet loss predictor; and a packetizer configured to transmit the frame aggregated data and the redundancy data, with being included in the data packet.

20 Claims, 5 Drawing Sheets

| 602 | 604 | 606 | 608 | 610 | 612 |
|---|---|---|---|---|---|
| RData pkt_size | RData pkt_count | Frame asm_count | FB congestion | FB loss_pred | FB loss_thr |

APPARATUS AND METHOD FOR TRANSMITTING/RECEIVING DATA IN COMMUNICATION SYSTEM

CROSS-REFERENCE TO RELATED APPLICATIONS

The present application claims priority of Korean Patent Application No. 10-2011-0111525, filed on Oct. 28, 2011, which is incorporated herein by reference in its entirety.

BACKGROUND OF THE INVENTION

1. Field of the Invention

Exemplary embodiments of the present invention relate to a communication system, and more particularly, to an apparatus and a method for normally transmitting/receiving data by recovering a loss of a data packet and avoiding a congestion at the time of transmitting/receiving a data packet so as to improve a quality of multimedia service in a wireless communication based All-Internet protocol (hereinafter, referred to as 'IP') network.

2. Description of Related Art

In a current communication system, researches for providing services having various qualities of services (hereinafter, referred to as QoSs) to users at a high transmission rate have been actively conducted. In particular, in a communication system, a terminal can provide various multimedia services, such as Internet access, mail, voice, image, and the like, using a packet network, for example, with the development of a wireless local area network (hereinafter, referred to as 'WLAN') system with the advent of a smart phone.

Further, as described above, in the communication system providing multimedia services through a terminal, various real-time multimedia services can be provided due to the advancement of a network, for example, the bandwidth expansion of a network and the improvement of a transmission rate of a network and the improvement in performance of the terminal. However, in spite of the advanced network, a late loss of transmission data may occur due to the increase in users wanting to receive multimedia services, the increase in a data quantity in response to the improvement of a quality of voice and image data, an intrinsic cause of the IP network that cannot guarantee QoS.

Further, the delay and loss in the real-time multimedia services cause the degradation in a quality of service for users wanting to receive multimedia services. In particular, various methods for minimizing a data loss that is a main cause of the degradation in a quality of service have been proposed. For example, a loss recovering method using a forward error correction (hereinafter, referred to as 'FEC') code, a transmission control method using a quality or loss feedback, a congestion avoidance method, and the like, have been proposed. However, the proposed methods have a limitation in data recovering performance and rate, data transmitting/receiving performance, and the like, when recovering the data lost in the communication system transmitting/receiving large-capacity data so as to provide lost data, in particular, multimedia services and avoiding the congestion at the time of transmitting/receiving data.

Therefore, in the communication system providing the multimedia services, a need exists for a method for transmitting/receiving data fast and normally by recovering the lost data and avoiding the congestion at the time of transmitting/receiving data so as to improve a quality of multimedia service.

SUMMARY OF THE INVENTION

An embodiment of the present invention is directed to provide an apparatus and a method for transmitting/receiving data in a communication system.

Another embodiment of the present invention is directed to provide an apparatus and a method for transmitting/receiving data fast and normally by recovering a loss of a data packet and avoiding congestion situations of a channel at the time of transmitting/receiving data so as to improve a quality of multimedia services in a communication system.

The foregoing and other objects, features, aspects and advantages of the present invention will be understood and become more apparent from the following detailed description of the present invention. Also, it can be easily understood that the objects and advantages of the present invention can be realized by the units and combinations thereof recited in the claims.

An apparatus for transmitting data in a communication system, includes: a depacketizer configured to receive loss information on a data packet and congestion information on the channel from a terminal receiving the data packet through the channel; a frame assembly configured to confirm a congestion situation predictor from the congestion information and frame-aggregate data transmitted to the terminal according to the congestion situation predictor; a redundancy controller configured to confirm a data packet loss predictor from the loss information and generate redundancy data of the data according to the data packet loss predictor; and a packetizer configured to transmit the frame aggregated data and the redundancy data, with being included in the data packet.

An apparatus for receiving data in a communication system includes: a depacketizer configured to receive a data packet from an access point (AP) through a channel and confirm frame aggregation and redundancy data of the data packet; a packet loss estimator configured to generate a data packet loss predictor corresponding to a transmission delay of the data packet; a congestion estimator configured to generate a congestion situation predictor of the channel; and a packetizer configured to transmit the data packet loss predictor and the congestion situation predictor to the AP through the data packet.

A method for transmitting data in a communication system includes: receiving loss information on a data packet and congestion information on the channel from a terminal receiving the data packet through the channel; confirming a congestion situation predictor from the congestion information and frame-aggregate data transmitted to the terminal according to the congestion situation predictor; confirming a data packet loss predictor from the loss information and generate redundancy data of the data according to the data packet loss predictor; and transmitting the frame aggregated data and the redundancy data, with being included to the data packet.

DESCRIPTION OF SPECIFIC EMBODIMENTS

Figure 1:
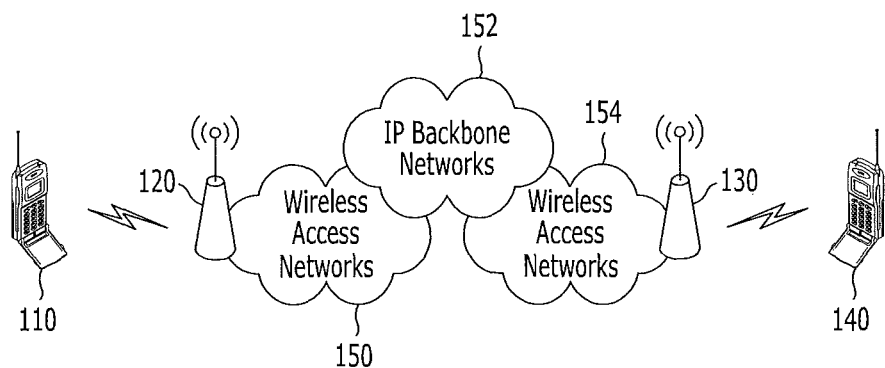
FIG. 1 is a diagram schematically illustrating a structure of a structure of a communication system in accordance with an embodiment of the present invention.

Hereinafter, exemplary embodiments of the present invention will be described in detail with reference to the accompanying drawings. It is to be noted that only components required to understand an operation according to the present invention is described below and the description of other components will be omitted not to unnecessarily obscure the subject matters of the present invention.

An embodiment of the present invention proposes an apparatus and a method for transmitting/receiving data in a communication system, for example, a communication system providing multimedia services. Here, although the embodiment of the present invention describes, by way of example, a communication system including a wireless communication based all-Internet protocol (hereinafter, referred to as 'IP') network, for example, a wireless local area network (hereinafter, referred to as 'WLAN') system, a method for transmitting/receiving data proposed in the present invention may also be applied to other communication systems.

Further, the embodiment of the present invention proposes an apparatus and a method for transmitting/receiving data corresponding to the multimedia services fast and normally by recovering a loss of a multimedia over IP data packet and avoiding a congestion of a channel occurring at the time of transmitting/receiving a data packet, in the communication system providing multimedia services. In accordance with the embodiment of the present invention, the communication system recovers the loss of the data packet that may occur at the time of providing the real-time multimedia services in the communication system, that is, the loss of the data packet occurring at the time of transmitting/receiving the data packet corresponding to the multimedia services and avoids the congestion situations of the channel occurring at the time of transmitting/receiving the data packet.

In particular, the communication system in accordance with the embodiment of the present invention adds redundant data to the multimedia data by a method that does not require a recovery delay time to recover the loss of the data packet, at the time of recovering the loss of the multimedia data corresponding to the multimedia services, that is, the data packet, predicts the loss of the data packet based on the transmission delay time of the data packet to minimize the loss of the data packet, and uses a media combining method under the congestion situations of the channel occurring at the time of transmitting/receiving the data packet to avoid the congestion situations of the channel, thereby transmitting/receiving the multimedia data fast and normally to provide the high-quality multimedia services. The embodiment of the present invention solves problems caused by various methods proposed so as to minimize the delay and loss in the real-time multimedia services, that is, the loss of data affecting a quality of experience of a user, for example, a loss recovering method using a forward error correction (hereinafter, referred to as 'FEC') code, a transmission control method using quality or loss feedback, a congestion avoidance method, and the like.

Describing in more detail, in the proposed various methods, a method of generating the recovery data from voice and image data using the FEC code, for example, a Reed-Solomon code, and the like, at the time of recovering the loss using the FEC code and then, adding the recovery data to the data packet at a predetermined interval, for example, adding the recovery data every three real-time transport protocol (hereinafter, referred to as 'RTP') as the data packet aggregates and transmits the recovery data and the voice and image data with the RTP packet and recovers the lost RTP packet using the recovery data when the loss of the RTP packet occurring at the time of transmitting and receiving the RTP packet is recovered at a receiving side. In this case, since the loss recovery is not performed until the RTP packet including the recovery data is received, the delay occurs and when the RTP packet including the recovery data is lost, the loss recovery of the lost RTP packet cannot be made.

In response to the loss of the data packet, that is, the RTP packet, the proposed various methods sense the loss of the RTP packet and a timestamp within an RTP-payload at the receiving side to feedback the actually generated loss information of the RTP packet to a transmitting side to adjust the error correction method at the transmitting side. However, in the proposed various methods, the network state cannot be predicted until the feedback information from the receiving side to the transmitting side, that is, the loss information of the RTP packet is reached, therefore the loss of the data packet may additionally occur.

For example, when the voice data are transmitted at an interval of 20 ms over the voice over IP (VoIP) and the transmission delay between terminations of the transmitting side and the receiving side, that is, the delay from an encoder output of the transmitting side to a decoder input of the receiving side is 100 ms, the information transmission delay of a minimum of 100 ms occurs in sensing at least one data packet loss by the receiving side and then transmitting the loss information of the data packet corresponding to the data packet loss to the transmitting side and an error correction technique suitable for the loss situation of the data packet is not applied to five voice data transmitted from the transmitting side to the receiving side for 100 ms, such that the quality of voice service is degraded.

Further, as the method of avoiding the congestion of the channel occurring at the time of transmitting/receiving the data packet, in the proposed various methods, it is confirmed whether the congestion of the network may permit a higher data transmission rate than present by additionally transmitting and receiving the redundant data to confirm whether the loss of the data packet occurs, for congestion avoidance of the network. However, in a wireless period between a terminal and an access point (AP) in the WLAN system, the congestion situations do not depend on only the transmission rate of data but are affected by a channel acquisition attempt of the terminal sharing channels, in other words, a packet transmission rate (packets/second) indicating the transmission frequency through the corresponding channel, such that the cases in which the congestion situations are not confirmed only by the increase and decrease in the data transmission rate may occur.

In the wireless period, the packet transmission rates may be different, but the data transmission rates may be the same. For example, when transmitting/receiving one voice data per the RTP packet from the voice data configured of 80 bytes generated every 20 ms, the packet transmission rate becomes 50 packet/sec. In this case, the data transmission rate becomes 32,000 (=50 packets*80 bytes*8 bits) bits/sec. However, when two voice data per the RTP packet are transmitted/received, the packet transmission rate becomes 25 packet/sec. In this case, the data transmission rate becomes 32,000 (=25 packets*160 bytes*8 bits) bits/sec, such that the data transmission rate has the same data transmission rate as the case in which one voice data per the RTP packet is transmitted. Therefore, in the proposed various methods, the cases in which the congestion situations of the channel are not confirmed only by the increase and decrease of the data transmission rate may occur.

In order to overcome the problems of the proposed various methods, in other words, in order to overcome the loss recovery delay using the FEC code and the impossibility of the loss recovery using the FEC code, the embodiment of the present invention aggregates and transmits/receives the previous voice and image data with the RTP packet by adding redundant data to the current data, such that the receiving side extracts and recovers the previous voice and image data from the redundant data included in the RTP packet without waiting for the recovery data like the loss recovery using the FEC code, such that the recovery delay time may be removed and the impossible situation of recovery due to the loss of the RTP packet including the recovery data like the case of using the FEC code may be prevented. Here, an example of the redundant data may include one data unit, for example, the voice and image data of one frame or more.

In addition, in the embodiment of the present invention, the bandwidth is controlled according to the redundant data. Describing in more detail, when the loss of the data packet is recovered using the redundant data, in order to control the increase and decrease in the bandwidth according to the redundant data, the amount of the redundant data, for example, the number of voice and image data is controlled by using the loss of the data packet and the congestion information of the channel predicted by the receiving side and the congestion information of the channel predicted by the transmitting side.

Further, in accordance with the embodiment of the present invention, in order to maximize the recovery of the lost data packet, the loss of the data packet is predicted based on the transmission delay time of the voice data measured by the receiving side and the predictor of the loss of the data packet according to the prediction is inserted into the RTP packet transmitted from the receiving side to the transmitting side and are fedback. In this case, the transmitting side controls and transmits/receives the redundant data for recovering the data packet according to the loss possibility of the data packet by analyzing the predictors of the loss of the data packet, such that the recovery possibility of the lost data packet is maximized when the loss of the data packet occurs in the receiving side.

Further, in accordance with the embodiment of the present invention, in order to avoid the congestion of the channel occurring at the time of transmitting/receiving the data packet, when the congestion situations of the transmission channel are predicted, that is, detected from the loss of the data packet and the congestion information of the channel predicted by the receiving side and the congestion information of the channel predicted by the transmitting side, the plurality of voice and image data are aggregated with one RTP packet to reduce the RTP packet transmission rate (packet/second), thereby avoiding the congestion situations of the channel. Hereinafter, the communication system in accordance with the embodiment of the present invention will be described in detail with reference to FIG. 1.

FIG. 1 is a diagram schematically illustrating a structure of a structure of the communication system in accordance with an embodiment of the present invention.

Referring to FIG. 1, the communication system includes APs 120 and 140 configured to multimedia data corresponding the multimedia services, that is, the data packet through the channel so as to provide various services, for example, multimedia services and terminals 110 and 140 configured to receive the data packet from the APs 120 and 130 through the channel and the APs 120 and 130 are connected through wireless connection networks 150 and 154 and an IP backbone network 152.

Here, the APs 120 and 140 recover the loss of the packet occurring at the time of transmitting/receiving the data packet through the channel and transmit the data packet to the terminals 110 and 130 so as to avoid the congestion situations of the channel at the time of transmitting/receiving the data packet and the terminals 110 and 130 receive the data packet and normally receive the data packet by recovering the data packet lost in the received data packet. The recovery of the loss of the data packet and the avoidance of the congestion situations of the channel are described below in more detail, and therefore the detailed description thereof will be omitted. Herein, the transmission/reception of data in the communication system in accordance with the embodiment of the present invention will be described in detail with reference to FIG. 2.

Figure 2:
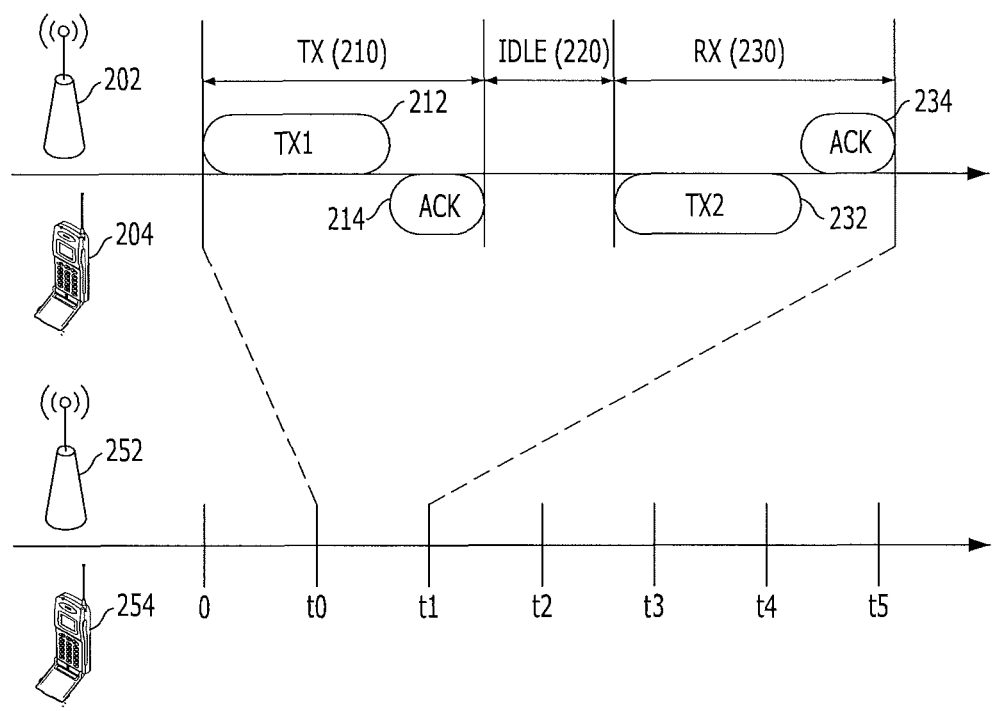
FIG. 2 is a diagram schematically illustrating transmission/reception of data in the communication system in accordance with the embodiment of the present invention.

FIG. 2 is a diagram schematically illustrating the transmission/reception of data in the communication system in accordance with the embodiment of the present invention.

Referring to FIG. 2, in the communication system, an AP 252 and a terminal 254 occupy a wireless channel in an arbitrary period to transmit/receive data between the AP 252 and the terminal 254 in the wireless channel divided into predetermined time periods t0, t1, t2, t3, t4, and t5. For example, in the wireless channel divided into the predetermined time periods t0, t1, t2, t3, t4, and t5, when the AP 202 and the terminal 204 occupy the wireless channel of the time period between t0 and t1, that is, a first time period, data are transmitted/received between the AP 202 and the terminal 204 in the first time period and the wireless channel of the first time period is occupied by the transmitting frame between the AP 202 and the terminal 204.

Describing in more detail, the AP 202 transmits the data packet and a transmitting frame TX1 to the terminal 204 in the transmitting 210 of the first time period and the terminal 204 transmits an ACK 214 as the receiving response of the transmitting frame (TX1) 212 to the AP 202. When the transmission of the data packet is completed from the AP 202 to the terminal 204, an idle period 220 is present and after the idle period 220 ends, the AP 202 receives the data packet, that is, the transmitting frame (TX2) 232 from the terminal 204 in the receiving period 230 and transmits an ACK 234 as the receiving response of the transmitting frame TX2 232 to the terminal 204.

In the communication system, the wireless channel for transmitting and receiving data between the AP 202 and the terminal 204 includes a transmitting period 210 of the transmission frame in the time period, a receiving period 230 of the transmitting frame, and the idle period 220. In particular, the period 203 in which the AP 202 receives the transmitting frame may be indicated by a busy period of the wireless channel. Here, when the transmitting frame are transmitted/received between the AP 202 and another terminal in the busy period of the wireless channel, the collision of the transmitting frames occurs and the transmission/reception of the corresponding frame may be erroneous. Therefore, in the communication system, the busy time of the channel measured for the specific time in the channel and the congestion of the channel for the idle time is measured. Here, the congestion of the channel may be represented by a frame collision probability and the frame collision probability measured for the specific time is defined by busy time/(busy time+idle time).

Describing in more detail, in the communication system, the AP broadcasts the congestion of the channel obtained by measuring the congestion state of the channel transmitting and receiving the frame to and from the terminals, for example, the frame collision probability to the terminals connected with the AP through a beacon frame or a probe response frame. Next, in the communication system in accordance with the embodiment of the present invention, the beacon frame or the probe response frame broadcast including the congestion of the channel will be described in more detail with reference to FIG. 3.

Figure 3:
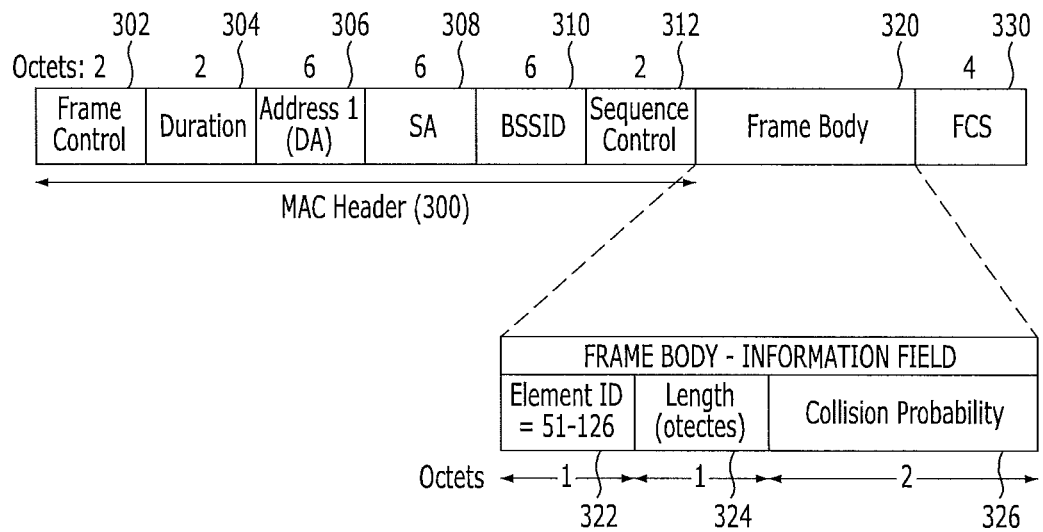
FIG. 3 is a diagram schematically illustrating a structure of a frame in the communication system in accordance with the embodiment of the present invention.

FIG. 3 is a diagram schematically illustrating a structure of a frame in the communication system in accordance with the embodiment of the present invention. FIG. 3 is a diagram schematically illustrating the structure of the beacon frame or the probe response frame including the congestion of the channel as described above, in the communication system in accordance with the embodiment of the present invention.

Referring to FIG. 3, the frame includes a media access control (MAC) header 300 including control information of the frame, a frame body field 320 as a data field including data transmitted through the frame, and a frame check sequence (FCS) field 330 for checking whether the frame is received normally. Here, the MAC header 300 includes a frame control field 302, a duration field 304, an address field 306, a service access (SA) field 308, a basic service set Identifier (BSSID) field 310, and a sequence control field 312.

Further, the frame, in other words, the beacon frame or the probe response frame includes the congestion of the channel, that is, the congestion information of the channel as described above and the congestion information of the channel is included in the frame body field 320 of the frame.

That is, an information field of the frame body field 320 includes an element ID field 322 including the identification information for the congestion information of the channel, the collision probability field 326 including the congestion information of the channel, and a length field 324 including size information of the collision probability field 326. For example, the channel congestion information is defined by the collision probability using an order 25 as an information element that is not defined in the frame of IEEE.802.11, the collision probability that is the information element includes the element ID field 322 indicating the collision probability, the collision probability field 326 including the collision probability, and the length field 324 indicating the size of the collision probability field 326, the collision element ID field 322 is defined by 52, and the length field is allocated as 2 octets, and the collision probability field 326 includes the collision probability of integer.

Further, in the communication system, the terminal extracts the congestion information of the channel from the beacon frame transmitted from the AP, that is, the collision probability of the channel so as to confirm the congestion state of the wireless channel with the AP connected with the terminal. Here, the collision probability of the channel is broadcast from the AP, with being included in the frame body field of the beacon frame and the terminal receives the beacon frame and then determines a type of frames received from the frame control field 302 of the beacon frame to confirm a transmitting subject of the beacon frame, that is, the AP based on the information included in the SA field 308 and the BSSID field 310.

As such, the terminal confirming the beacon frame using the frame control field 302 and confirming the AP using the SA field 308 and the BSSID field 310 decodes the frame body field 320 of the beacon frame to confirm the collision probability using the element ID field 322 and confirm the information included in the collision field 326 corresponding to the size information included in the length field 324 as the collision probability. For example, when the value obtained by decoding the collision probability field 326 is 3546, the actual collision probability becomes 0.003456.

Further, in the communication system, in order to confirm the congestion state of the channel within the basic service set (BSS) included in the terminal, the terminal measures the congestion information of the channel predicted by the AP, that is, the collision probability of the channel confirmed by using the beacon frame as described above as well as the terminal itself measures the congestion state of the channel to generate the congestion information of the channel. In other words, the terminal confirms the collision probability of the channel received from the AP and the congestion information of the channel based on the retransmission frequency in the MAC layer occurring at the time of transmitting/receiving the data packet to and from the AP and the terminal itself calculates the collision probability like the calculation of the collision probability in the AP to confirm the congestion information of the channel. Here, the case in which the retransmission frequency and the collision probability exceed a preset threshold is confirmed as the congestion situations of the channel. Hereinafter, the data packet transmitting/receiving between the AP and the terminal in the communication system in accordance with the embodiment of the present invention will be described in more detail with reference to FIGS. 4 to 6.

Figure 4:
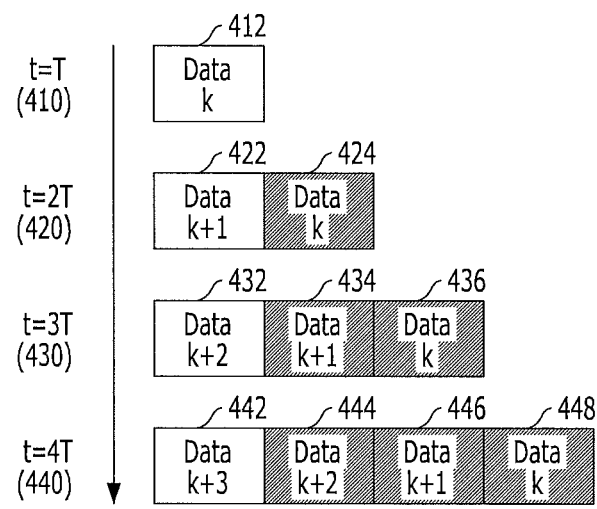
FIGS. 4 to 6 are diagrams schematically illustrating a structure of a data packet in the communication system in accordance with the embodiment of the present invention.
Figures 5, 6:
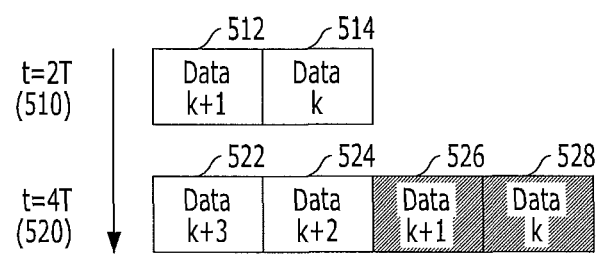

FIGS. 4 to 6 are diagrams schematically illustrating a structure of a data packet in the communication system in accordance with the embodiment of the present invention. FIG. 4 is a diagram schematically illustrating the structure of the data packet in which the previous frame is generated as the redundant data so as to recover the loss of the data packet in the communication system in accordance with the embodiment of the present invention. FIG. 5 is a diagram schematically illustrating the structure of the data packet generated by the frame aggregating method in correspondence with the congestion information of the channel in the communication system in accordance with the embodiment of the present invention, that is, the congestion information of the channel. Further, FIG. 6 is a diagram schematically illustrating a data packet, for example, a payload structure of the RTP packet in the communication system in accordance with the embodiment of the present invention.

Referring first to FIG. 4, in the communication system, the transmitting side, for example, the AP determines the number of redundant data, that is, the number of data frames based on the predictor of the loss of the data packet received from the receiving side, for example, the terminal. In this case, when the predictor of the loss of the data packet is large, the number of redundant data is increased and when the predictor of the loss of the data packet is small, the number of redundant data is maintained or reduced.

For example, when the predictor of the loss of the data packet is large, the AP generates the data packet by the method of adding the redundant data. In this case, so as to prevent the processing delay of the receiving side, that is, the terminal, the AP continuously adds a current data frame and a data frame just before the current data frame to generate the data packet, that is, generate the redundant data for recovering the data packet loss, thereby generating the data packet. For example, when the data of the current time each are Data k 412 at a first time (t=T) 410, Data k+1 422 at a second time t=2T, Data k+2 432 at a third time t=3T 430, and Data k+3 442 at a fourth time t=4T 440, the redundant data of each current time is data at the just previous time, that is, at a second time t=2T 420, Data k 424 of the first time t=T 410 becomes the redundant data, at a third time t=3T 430, Data k+1 434+Data k 436 of the second time t=2T 420 becomes the redundant data, and at the fourth time t=4T 440, Data k+2 444+Data k+1 446+Data k 448 becomes the redundant data.

In the communication system, the transmitting side, that is, the AP transmits the data at the current time and the redundant data as the data packet. In this case, the data at the current time and the data included in the data packet of the previous time as the redundant data are continuously added to the data packet.

Further, referring to FIG. 5, in the communication system, when the transmitting side, for example, the AP confirms the congestion situations of the channel based on the congestion information of the channel, the AP frame-aggregates data generated at a T interval to transmit the frame aggregated data frame as the data packet to the receiving side, for example, the terminal.

For example, as described above, when the data are generated at a T interval, in other words, when at the first time t=T, Data k, at the second time t=2T, Data k+1, at the third time Data k+2, and at the fourth time t=4T, Data k+3 are generated, the channel is in the congestion situation, such that the data generated at the T interval are frame-aggregated and an aggregated frame stores the previously generated data, and thus two data per the data packet, that is, the two data frames are aggregated at the 2T interval. That is, at the second time t=2T 510, an aggregated frame of a data frame 514 of Data k that is the data of the first time t=T and a data frame 512 of Data k+1 that is the data of the second time t=2T is transmitted as the data packet.

Further, at the fourth time t=4T 520, a data frame 524 of Data k+2 that is the data of the third time t=3T and a data frame 522 of Data k+3 that is the data of the fourth time t=4T become an aggregated frame. In this case, as described above, as the data of the just previous time for recovering the loss of the data packet is the redundant data, an aggregated frame of the data frame 522 of the fourth time t=4T and the data frame 524 of the third time t=3T is transmitted as the redundant data and an aggregated frame of a data frame 526 of the second time t=2T and a data frame 528 of the first time t=T is transmitted as the data packet. Here, according to the aggregation sequence of the data frame in the aggregated frame, the latest generated data frame is arranged as the data frame approaches a header field of the RTP packet. Here, the foregoing data packet, in other words, the payload of the RTP packet will be described in more detail with reference to FIG. 6.

Referring to FIG. 6, the RTP packet includes the header field (not illustrated) and the payload and the payload of the packet includes the redundant data information, in other words, a RData_pkt_size field 602 including the size information of the redundant data, a RData_pkt_count field 604 including information on the number of redundant data, a Frame_asm_count field 606 including the frame aggregation information, a FB congestion field 608 including the congestion information, that is, the congestion situation prediction value, a FB loss_pred field 610 including the data packet loss prediction value, and a FB loss_thr field 612 including the data packet loss threshold.

Here, in the RTP packet, the header field is first generated and then the payload is generated. In other words, the RData pkt_size 602, the RData pkt_count field 604, the Frame asm_count field 606, the FB congestion field 608, the FB loss_pred field 610, and the FB loss_thr 612 are sequentially generated. Herein, the structure of the transmitting side, that is, the AP in the communication system in accordance with the embodiment of the present invention will be described in more detail with reference to FIG. 7.

Figure 7:
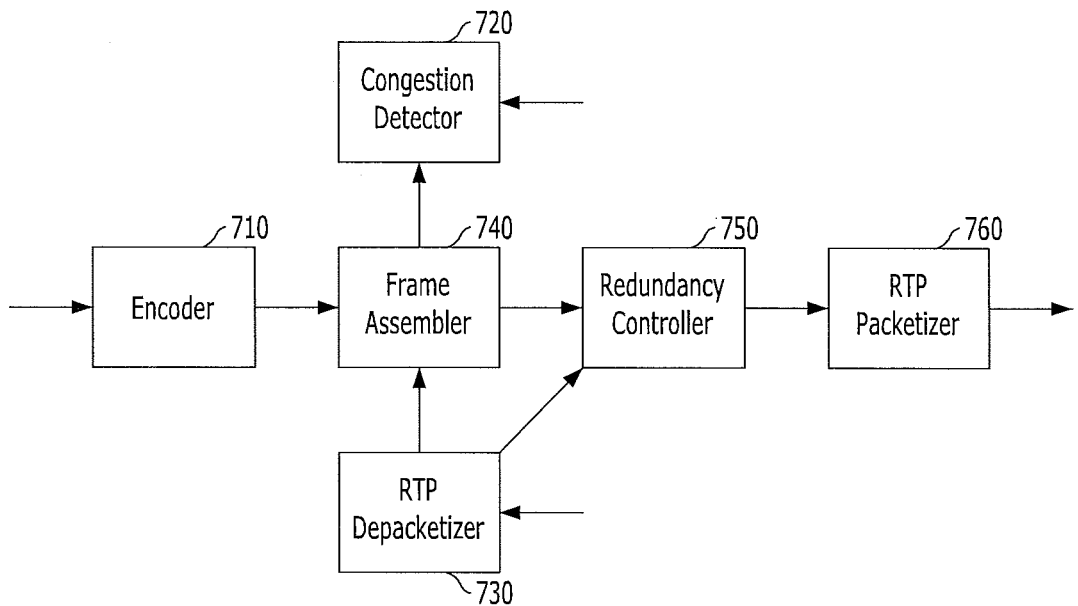
FIG. 7 is a diagram schematically illustrating a structure of an apparatus for transmitting data in the communication system in accordance with an embodiment of the present invention.

FIG. 7 is a diagram schematically illustrating a structure of an apparatus for transmitting data in the communication system in accordance with the embodiment of the present invention. FIG. 7 is a diagram schematically illustrating the structure of the transmitting side, that is, the AP in the communication system in accordance with the embodiment of the present invention.

Referring to FIG. 7, the apparatus for transmitting data includes an encoder 710 configured to encode data to be transmitted to the receiving side, that is, the terminal, a congestion detector configured to calculate the congestion information of the channel, that is, the collision probability of the channel, an RTP depacketizer 730 configured to decode the data packet received from the terminal, a frame assembler 740 configured to aggregate the data frame according to the congestion situation of the channel, a redundancy controller 750 configured to add the redundant data to the frame aggregated data, and an RTP packetizer 760 configured to generate the frame aggregated data and the redundant data as the data packet and transmit the generated data to the terminal.

The encoder 710 generates the data to be transmitted to the terminal, for example, generates and encodes the data at the T interval as described above.

As described above, the congestion detector 720 calculates the congestion of the channel, that is, the frame collision probability for the specific time over the busy period and the idle period in the terminal and the occupied channel to calculate the collision probability of the channel and the collision probability of the channel is broadcast to the terminals connected with the AP through the beacon frame. Further, the congestion detector 720 receives the congestion information of the channel predicted by the terminal and calculates the congestion situation prediction value of the channel in consideration of the congestion information and collision probability of the channel.

When receiving the data packet received from the terminal, in other words, the RTP packet, the RTP depacketizer decodes the RTP packet to extract the congestion information of the channel included in the RTP packet, that is, extracts the congestion information of the channel predicted by the terminal and then transmits the congestion information to the frame assembler 740 and the congestion detector 720. Further, the RTP depacketizer 730 extracts the data packet loss prediction value and the data packet loss threshold from the RTP packet and transmits the extracted values to the redundancy controller 750.

The frame assembly 740 confirms the congestion state of the channel based on the congestion situation prediction value of the channel, in other words, the collision probability and congestion information of the channel and then frame-aggregates the data according to the congestion state of the channel. That is, the frame assembler 740 determines the frame aggregation of the data in consideration of both of the congestion information of the channel predicted by the terminal and the congestion information of the channel predicted by the AP and aggregates the data frames. Here, the frame aggregation according to the congestion situation of the channel is described in detail in advance and therefore the detailed description thereof will be omitted.

The redundancy controller 750 uses the data packet loss prediction value and the data packet loss threshold included in the RTP packet received from the terminal to determine the number of redundant data added to the current data, that is, the number of data frames and then generate the redundant data. Here, the redundant data and the addition of the redundant data are described in detail in advance and the detailed description thereof will be omitted.

The RTP packetizer 760 generates the data packet, that is, the RTP packet included in the final data generated by the frame aggregation of the data and the addition of the redundant data and transmits the RTP packet to the terminal. As described above, the RTP packetizer 760 first generates the header field of the RTP packet and generates the payload and the payload is generated in an order of the RData pkt_size, the RData pkt_count field, the Frame asm_count field, the FB congestion field, the FB loss_pred field, and the FB loss_thr field. Herein, the structure of the receiving side, that is, the terminal in the communication system in accordance with the embodiment of the present invention will be described in more detail with reference to FIG. 8.

Figure 8:
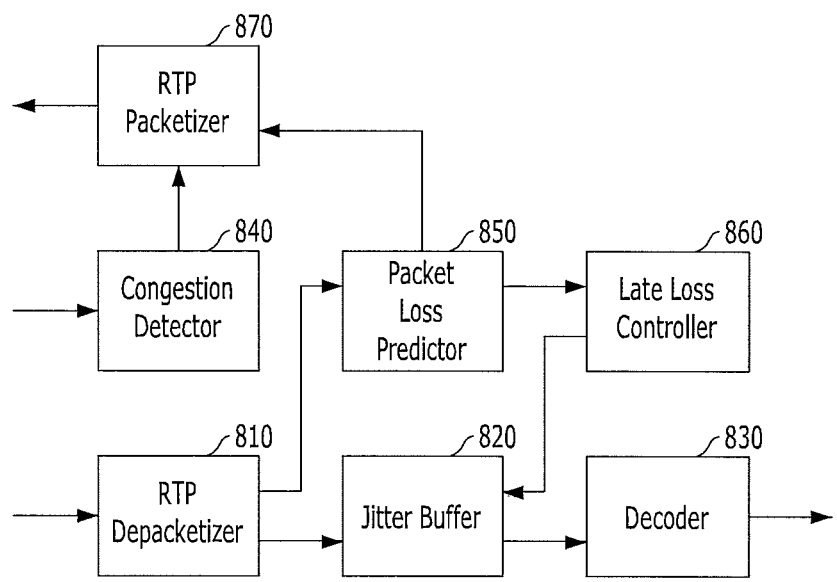
FIG. 8 is a diagram schematically showing a structure of an apparatus for receiving data in the communication system in accordance with the embodiment of the present invention.

FIG. 8 is a diagram schematically illustrating a structure of an apparatus for receiving data in the communication system in accordance with the embodiment of the present invention. FIG. 8 is a diagram schematically illustrating the structure of the receiving side, that is, the terminal in the communication system in accordance with the embodiment of the present invention.

Referring to FIG. 8, the apparatus for receiving data includes an RTP depacketizer 810 configured to receive the RTP packet and confirm the data frame, a jitter buffer 520 configured to store the data frame, a decoder 830 configured to decode the data frame and reconstruct an original data, a congestion detector 840 configured to receive the congestion information of the channel predicted by the AP from the AP, a packet loss estimator 850 configured to estimate the data packet loss from the delay information of the RTP packet, a late loss controller 860 configured to control the late loss according to the delay of the RTP packet, and an RTP packetizer 870 configured to generate the data packet including the congestion information and the data packet loss prediction value and transmit the generated data packet to the AP.

Describing in more detail, the RTP depacketizer 810 measures the received packet delay time corresponding to the reception of the RTP packet from the AP and transmits the delay information to the packet loss estimator 850 and confirms the aggregated frame of the RTP packet and then separates the aggregation frame to the jitter buffer 820. Further, the RTP depacketizer 810 confirms the redundant data for recovering the data packet loss in the RTP packet and transmits only the original data frame other than the redundant data in the RTP packet to the jitter buffer 820. In this case, the loss of the data packet is present at the time of receiving the RTP packet prior to receiving the current RTP packet, the same data as the lost data packet is present in the redundant data, and the corresponding data are transmitted to the jitter buffer in a defined order.

The packet loss estimator 850 calculates three delay values indicating delay deviation, short-term delay tendency, and long-term delay tendency to estimate the data packet loss and transmits the data packet loss prediction value to the late loss controller 860 and the RTP packetizer 870.

When the data packet loss prediction value larger than the data packet loss threshold is received from the packet loss estimator 850, the late loss controller 860 controls the late loss generated from the jitter buffer 820 by the data packet delay. In this case, the late loss controller 860 extends the size of the jitter buffer.

The congestion detector 840 compares the congestion information of the channel predicted by the AP, for example, the collision probability and the congestion information of the channel predicted by the terminal, for example, the collision probability and the retransmission frequency with the threshold to transmit the congestion situation prediction value of the channel to the RTP packetizer 870. Further, the RTP packetizer 870 transmits the congestion situation prediction value of the channel included in the payload of the RTP packet to the AP.

Describing in more detail the terminal herein, the packet loss estimator 850 receives the packet transmission information of the RTP packet, that is, the delay value from the RTP depacketizer 810 and predicts the packet loss from the delay value input as a stream. In order to analyze the characteristics of the packet delay, three values indicating the delay deviation, the short-term delay tendency, and the long-term delay tendency are used.

Here, the delay deviation indicates a position of a delay value Dk of the currently received data packet within the delay time change range between the data packet loss threshold delay and the smallest data packet delay. For example, as the current input delay is small, the delay value approaches 0 and as the current input delay is large, the delay value approaches 1 corresponding to the data packet loss threshold. Further, this means that the data packet loss probability is high as the delay deviation is large and an initial value of a delay threshold Dthr is determined as a value twice to three times larger than a minimum data packet transmission delay value Dbase measured up to now and then, when the data packet loss occurs, the delay value of the data packet received just before the loss and the delay value of the packet received just before the delay are determined as the data packet loss threshold value Dthr. Here, the delay time change range Min-Max between the data packet loss threshold delay and the smallest data packet delay may be represented by the following Equation 1.

$$MinMax = \min\left(1, \frac{D^k - D_{base}}{D_{thr} - D_{base}}\right) \quad \text{[Equation 1]}$$

Further, the long-term delay tendency is calculated by generating the delay window in which the delay stream is configured as any delay values of 20 to 50 and then moving the delay window every time a new data packet is received. Here, Spct is calculated by comparing the sizes between the current data packet delay with the just previous data packet delay within the delay window and the Spct is a parameter indicating whether the delay value is larger or smaller within the delay stream may be represented by the following Equation 2.

$$Spct = \frac{\sum_{k=2}^{\gamma} I(D^k > D^{k-1})}{\gamma - 1}, \quad \text{[Equation 2]}$$

$$I(X) = 1 \text{ if } X, \text{ else } 0$$

Further, Spdf is a parameter indicating whether the delay stream is increased or reduced by dividing the delay difference between the final and first delay windows by a sum of the differences in the adjacent delay values and may be represented by the following Equation 3.

$$Spdf = \frac{D^\gamma - D^1}{\sum_{k=2}^{\gamma} |D^k - D^{k-1}|}$$ [Equation 3]

Further, the long-term delay tendency is calculated as an average value of three values of the parameters, that is, MinMax, Spct, and Spdf for each division.

Further, the short-term delay tendency is calculated using the Spdt calculation of the long-term delay tendency and a sharpness indicator. In this case, the delay window size is reduced to the 5 to 10 data packets. The SI is a parameter indicating a change width between the adjacent delay values and can confirm how much the delay is suddenly increased. tt is the time required to receive the current data packet.

Further, as described above, the short-term delay tendency is calculated an average value of Spdt and SI, where SI may be represented by the following Equation 4.

$$SI = \max\left(-1, \min\left(1, \frac{D^k - D^{k-1}}{t^k - t^{k-1}}\right)\right)$$ [Equation 4]

The data packet loss predictor is calculated using the delay deviation, the short-term delay tendency, and the long-term tendency and may be represented by Equation 5. In this case, different weights are applied to each variable according to the value of the delay deviation, and thus the delay tendency may be sufficiently reflected.

predictor=$\omega_1$*MinMax+$\omega_2$*STermTrend+
$\omega_3$*LTermTrend [Equation 5]

In Equation 5, the data packet loss predictor is determined according to $$\omega_1 = \sqrt{MinMax}/2,$$
$$\omega_2 = \sqrt{MinMax}/2 \times (1 - \omega_4),$$
$$\omega_3 = \sqrt{MinMax}/2 \times \omega_4,$$
$$\omega_4 = \begin{cases} 1, & MinMax \leq 0.4 \\ 1 - (MinMax - 0.4)/0.3, & 0.4 < MinMAx \leq 0.7 \\ 0, & MinMax > 0.7 \end{cases}$$

The data packet loss predictor is transmitted to the AP, with being included in the RTP data packet together with the data packet loss threshold and as described above, the data packet loss predictor is used to generate the redundant data for the AP to recover the data packet loss. That is, the data packet loss predictor is included in the FB loss_pred of the RTP payload by the RTP packetizer 870 and the packet loss threshold is included in the FB loss_thr field.

Further, the late loss controller 860 receives the data packet loss predictor calculated as described above from the packet loss predictor 850 to control the late loss occurring the jitter buffer 820 due to the data packet delay. In this case, when the data packet loss predictor exceeds the packet loss threshold, the late loss controller 860 indicates the expansion of the buffer size of the jitter buffer 820 to prevent the additional late loss due to the long transmission delay time of the data packet.

Further, the congestion detector 840 confirms whether the congestion information of the channel predicted by the AP, in other words, the collision probability and the congestion information predicted by the terminal, for example, the collision probability and the retransmission frequency exceeds the threshold and transmits the congestion situation predictor to the RTP packetizer 870 and the congestion situation predictor is transmitted to the AP, with being included in the FB congestion field of the payload of the RTP packet.

Further, the RTP depacketizer 810 receives the RTP packet to confirm whether the payload of the RTP packet includes the aggregation frame. In this case, when the FB asm_count field value is 1, the RTP depacketizer 810 does not include the aggregation frame and when the FB asm_count field value is 2 or more, the RTP depacketizer 810 includes the frames as much as the correspond number as the aggregation frame. Here, when the aggregation frames are included, the aggregation frames are each separated as much as the original frame size and in the separated frames, a frame farther from the header of the RTP packet is preferentially transmitted to the jitter buffer 820. Further, when the loss of the previous data packet of the currently received data packet is not present, the first data other than the redundant data is transmitted to the jitter buffer 820 and when the loss of the data packet is present, it is confirmed whether the recoverable lost data are present based on the number of redundant data. For example, when the previously lost data packet is Data k+1, the currently received data packet is Data k+3 and 3 is included in the RD data pkt_count field indicating the number of redundant data, the data Data k+3 included in the currently received data packet and the lost Data k+1 are recovered since the redundant data are Data k+2, Data k+1, and Data k+1. In this case, Data k+1 to Data k+3 are sequentially transmitted to the jitter buffer 820. Herein, the data transmission in the communication system in accordance with the embodiment of the present invention will be described in more detail with reference to FIG. 9.

Figure 9:
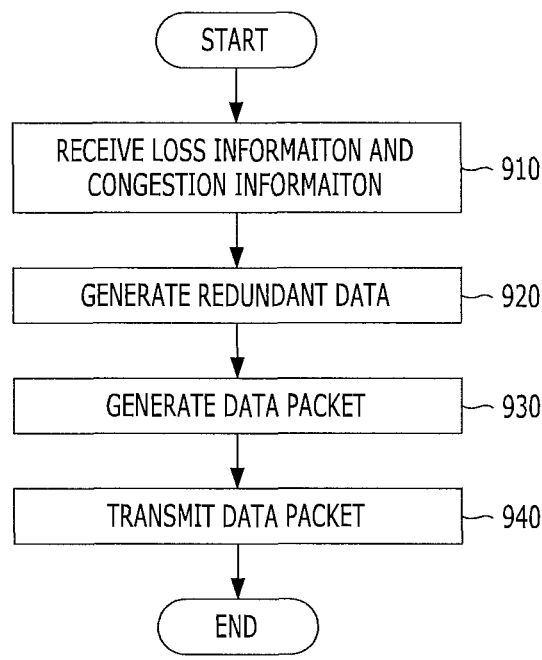
FIG. 9 is a diagram schematically illustrating a process of transmitting data of the apparatus for transmitting data in the communication system in accordance with the embodiment of the present invention.

FIG. 9 is a diagram schematically illustrating a process of transmitting data of the apparatus for transmitting data in the communication system in accordance with the embodiment of the present invention. FIG. 9 is a diagram schematically illustrating an operation of the apparatus of transmitting data, that is, the AP in the communication system in accordance with the embodiment of the present invention.

Referring to FIG. 9, in S910, the apparatus of transmitting data receives the data packet loss information, that is, the data packet loss predictor and the congestion information of the channel, that is, the congestion situation predictor of the channel.

Further, in S920, the congestion situation of the channel is confirmed in response to the channel congestion information, that is, the congestion situation predictor of the channel, and then any number of data frames is frame-aggregated. Further, the number of redundant data is determined in response to the data packet loss predictor to generate the redundant data.

Next, in S930, the data packet including the frame aggregation and the redundant data, in other words, the RTP packet is generated and in S940, the data packet is transmitted.

Here, the operation for transmitting data packet in the AP is already described in detail and therefore the detailed description thereof will be omitted. Herein, the data reception in the communication system in accordance with the embodiment of the present invention will be described in more detail with reference to FIG. 10.

Figure 10:
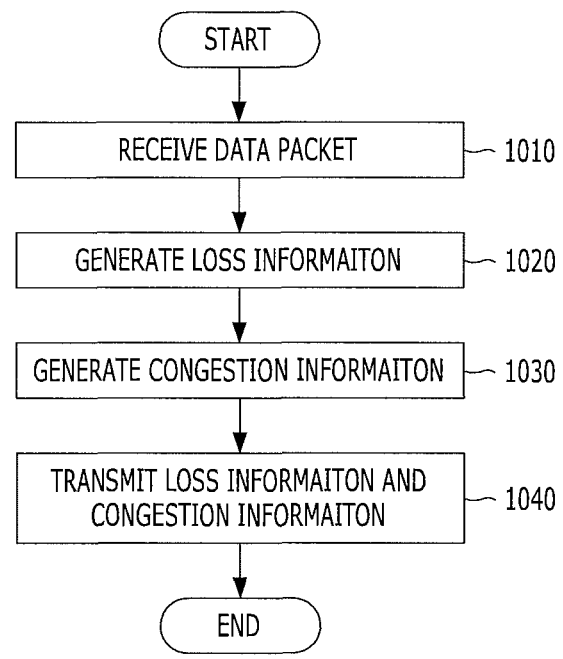
FIG. 10 is a diagram schematically showing an operation process of the apparatus for receiving data in the communication system in accordance with the embodiment of the present invention.

FIG. 10 is a diagram schematically illustrating an operation process of an apparatus for receiving data in the communication system in accordance with the embodiment of the present invention. FIG. 10 is a diagram schematically illustrating the operation of the apparatus for receiving data, that is, the terminal in the communication system in accordance with the embodiment of the present invention.

Referring to FIG. 10, the apparatus for receiving data receives the data packet and the RTP packet from the AP in step 1010 and generates the loss information of the received data packet, that is, the data packet loss predictor in step 1020.

Then, the apparatus for receiving data generates the congestion information of the channel through which the data packet is transmitted/received, in other words, the congestion situation predictor of the channel in step 1030 and transmits the loss information and the congestion information are transmitted in step 1040. That is, the data packet loss predictor and the congestion situation predictor are included in the data packet and are transmitted to the AP.

Here, since an operation for receiving the data packet in the terminal has been described above in detail, a detailed description thereof will be omitted.

In the communication system in accordance with the embodiment of the present invention as described above, at the time of recovering the loss of the multimedia data corresponding to the multimedia data, that is, the data packet, the redundancy data are added to the multimedia data in the scheme in which the recover delay time is not required to recover the loss of the data packet and predict the data packet loss based on the transmission delay time of the data packet, such that the packet loss is minimized, and the channel congestion situation is avoided in the media aggregation scheme in a channel congestion situation generated at the time of transmitting/receiving the data packet to rapidly and normally transmitting/receiving the multimedia data, thereby making it possible to provide the high quality multimedia service.

In accordance with the embodiment of the present invention, in the communication system, the redundancy data are added to the multimedia data in the scheme in which the recover delay time is not required to recover the packet loss and predict the packet loss based on the transmission delay time, such that the packet loss is minimized, and the congestion situation is avoided in the media aggregation scheme in each channel congestion situation generated at the time of transmitting/receiving the data to rapidly and normally transmitting/receiving the multimedia data, thereby making it possible to improve the multimedia service quality.

While the present invention has been described in connection with the exemplary embodiments thereof, various modifications and variations can be made without departing from the scope of the present invention. Therefore, the scope of the present invention should be not construed as being limited to the described exemplary embodiments but be defined by the appended claims as well as equivalents thereto.

What is claimed is:

1. An apparatus for transmitting data in a communication system, comprising:
 a depacketizer configured, via a processor, to receive loss information on a data packet and congestion information on a channel from a terminal receiving the data packet through the channel;
 a frame assembly configured, via the processor, to confirm a congestion situation predictor from the congestion information, and frame-aggregate data being transmitted to the terminal according to the congestion situation predictor in order to avoid congestion of the channel at a time when transmitting/receiving the data packet;
 a redundancy controller configured to confirm a data packet loss predictor from the loss information, and generate redundancy data of the data according to the data packet loss predictor in order to recover a loss of the data packet at the time when transmitting/receiving the data packet; and
 a packetizer configured, via the processor, to transmit the frame-aggregated data and the redundancy data, with being included in the data packet,
 wherein a count of frames of the frame-aggregated data is determined based on the congestion situation predictor,
 wherein the count of the redundancy data is determined based on the data packet loss predictor,
 wherein the redundancy data for first data corresponding to the data packet transmitted/received at the time are generated as second data corresponding to the data packet immediately transmitted/received before the time,
 wherein the second data as the redundancy data of the first data are added to the first data.

2. The apparatus of claim 1, wherein a payload of the data packet includes a field including information on a size of the redundancy data and a filed including information on the count of the redundancy data.

3. The apparatus of claim 1, wherein a payload of the data packet includes a field including information on frame aggregation of the frame-aggregated data, and
 the field includes information on the count of the frames of the frame-aggregated data.

4. The apparatus of claim 1, wherein a payload of the data packet includes a field including the congestion situation predictor, and
 the depacketizer receives a data packet including the congestion situation predictor from the terminal.

5. The apparatus of claim 1, wherein a payload of the data packet includes a field including the data packet loss predictor and a field including a loss threshold for loss of the data packet, and
 the depacketizer receives a data packet including the data packet loss predictor and the loss threshold from the terminal.

6. The apparatus of claim 1, further comprising:
 a congestion detector configured to calculate a frame collision probability in the channel to confirm a congestion situation of the channel,
 wherein the frame collision probability is included in a frame body of a beacon frame, and is broadcasted to the terminal.

7. The apparatus of claim 1, wherein the frame assembler frame-aggregates a data frame generated in a first time interval with the data frame corresponding to the data in an integer multiple period of the first time interval.

8. The apparatus of claim 1, wherein the redundancy controller generates redundancy data for first data corresponding to a first data packet transmitted/received at a first time as second data corresponding to a second data packet data packet immediately transmitted/received before the first time and add the second data as redundancy data of the first data to the first data.

9. An apparatus for receiving data in a communication system, comprising:
 a depacketizer configured, via a processor, to receive a data packet from an access point (AP) through a channel, and confirm frame aggregation and redundancy data of the data packet;

a packet loss estimator configured, via the processor, to generate a data packet loss predictor corresponding to a transmission delay of the data packet in order to recover a loss of the data packet at a time when transmitting/receiving the data packet;

a congestion estimator configured, via the processor, to generate a congestion situation predictor of the channel in order to avoid congestion of the channel at the time when transmitting/receiving the data packet; and a packetizer configured, via the processor, to transmit the data packet loss predictor and the congestion situation predictor to the AP through the data packet, wherein a count of frames of frame-aggregated data according to the frame aggregation is determined based on the congestion situation predictor, wherein the count of the redundancy data is determined based on the data packet loss predictor, wherein the redundancy data for first data corresponding to the data packet transmitted/received at the time are generated as second data corresponding to the data packet immediately transmitted/received before the time, wherein the second data, as the redundancy data of the first data, is added to the first data.

10. The apparatus of claim 9, wherein a payload of the data packet includes a field including information on a size of the redundancy data and a filed including information on the count of the redundancy data.

11. The apparatus of claim 9, wherein a payload of the data packet includes a field including information on the frame aggregation, and the field includes information on the count of frames of the frame: aggregated data.

12. The apparatus of claim 9, wherein a payload of the data packet includes a field including the congestion situation predictor, and the packetizer transmits a data packet including the congestion situation predictor to the AP.

13. The apparatus of claim 9, wherein a payload of the data packet includes a field including the data packet loss predictor and a field including a loss threshold for loss of the data packet, and the packetizer transmits a data packet including the data packet loss predictor and the loss threshold to the AP.

14. The apparatus of claim 9, wherein the congestion detector receives a frame collision probability calculated in the channel by the AP through a beacon frame, and the frame collision probability is included in a frame body of a beacon frame and is broadcasted from the AP.

15. The apparatus of claim 9, wherein the packet loss estimator generates the data packet loss predictor and a loss threshold for loss of the data packet in consideration of a delay deviation of the data packet, a short-term delay tendency, and a long-term delay tendency.

16. The apparatus of claim 9, wherein the congestion estimator generates the congestion situation predictor in consideration of a frame collision probability in the channel and the number of retransmission attempts.

17. The apparatus of claim 9, further comprising:
a delay loss controller configured to control a size of a jitter buffer storing data included in the data packet according to a transmission delay of the data packet; and a decoder configured to reconstruct original data transmitted by the AP in the data packet in consideration of the frame aggregation and the redundancy data of the data packet and recover the lost data packet through the redundancy data.

18. A method for transmitting data in a communication system, comprising:

receiving loss information on a data packet and congestion information on, a channel from a terminal receiving the data packet through the channel;

confirming a congestion situation predictor from the congestion information and frame-aggregate data being transmitted to the terminal according to the congestion situation predictor in order to avoid congestion of the channel at a time when transmitting/receiving the data packet;

confirming a data packet loss predictor from the loss information and generate redundancy data of the data according to the data packet loss predictor in order to recover a loss of the data packet at the time when transmitting/receiving the data packet; and transmitting the frame-aggregated data and the redundancy data, with being included to the data packet:

wherein a count of frames of the frame-aggregated data is determined based on the congestion situation predictor;

wherein the count of the redundancy data is determined based on the data packet loss predictor, wherein the redundancy data for first data corresponding to the data packet transmitted/received at the time are generated as second data corresponding to the data packet immediately transmitted/received before the time, wherein the second data as the redundancy data of the first data are added to the first data.

19. The method of claim 18, wherein a payload of the data packet includes field including information on a size of the redundancy data filed including information on the count of the redundancy data, a field including information on the count of frames of the frame-aggregated data, field including the congestion situation predictor, field including the data packet loss predictor, and the field including a loss threshold for loss of the data packet.

20. A method for receiving data in a communication system, comprising:

receiving a data packet from an access point (AP) through a channel;

confirming frame aggregation and redundancy data of the data packet;

generating a data packet loss predictor corresponding to a transmission delay of the data packet in order to recover a loss of the data packet at time when transmitting/receiving the data packet;

generating a congestion situation predictor of the channel in order to avoid congestion of the channel at the time when transmitting/receiving the data packet; and transmitting the data packet loss predictor and the congestion situation predictor to the AP through the data packet, wherein a count of frames of frame-aggregated data according to the frame aggregation is determined based on the congestion situation predictor, wherein the count of the redundancy data is determined based on the data packet loss predictor, wherein the redundancy data for first data corresponding to the data packet transmitted/received at the time are generated as second data corresponding to the data packet immediately transmitted/received before the time, wherein the second data as the redundancy data, of the first data is added to the first data.

* * * * *